UNITED STATES PATENT OFFICE.

FRANK R. STEHM, OF DES MOINES, IOWA, ASSIGNOR TO ENAMEL CONCRETE COMPANY, OF DES MOINES, IOWA, A CORPORATION OF SOUTH DAKOTA.

WATERPROOFING COMPOUND FOR CEMENT, CONCRETE, AND THE LIKE.

1,141,848.  Specification of Letters Patent.  Patented June 1, 1915.

No Drawing.   Application filed January 22, 1912.   Serial No. 672,651.

*To all whom it may concern:*

Be it known that I, FRANK R. STEHM, a citizen of the United States, residing at Des Moines, in the county of Polk and State of Iowa, have invented a new and useful Improvement in Waterproofing Compounds for Cement, Concrete, and the like, of which the following is a specification.

The object of the present invention is to provide a compound or composition of matter in liquid form, to be used as an admixture for cement or concrete to render it water-proof. The material is supplied, not as a surface dressing, but as a component part of the structure and by permeating all parts thereof, produces special advantageous results.

To make up the composition, I take the following ingredients in about the proportions named: sixty gallons of kerosene, putting therein ten pounds of spermaceti wax and two and one-half gallons cotton-seed oil. These are placed in a steam jacketed tank and there heated until the mass is brought to a fluid condition. At a temperature of about 180 degrees Fahrenheit, the kerosene oil dissolves the wax and the composition becomes thoroughly blended and can be drawn off for shipment.

In using the composition above described, to produce a water-proofed concrete, I proceed by first adding water in the proportions of about twelve parts water to one part of the compound and then I mix the fluid mixture so produced with the cement and other materials used ordinarily in the production of concrete. The exact proportions of water and compound may be varied through considerable limits, but the above relation is suitable for making enamel faced product. The highly fluid character of the compound renders it particularly adapted for insuring an intimate mixing with the concrete materials which become thoroughly permeated with the water-proofing compound, much more so than is the case when a dry water-proofing is mixed with the cement, prior to the addition of the water.

The component parts of my water-proofing compound being of greasy nature, its use facilitates the removal or release of the finished concrete blocks or bricks from the forming molds, by acting as a sort of lubricant.

The concrete product produced by the use of this compound is stronger than when the compound is absent, and coloring matter when added to color the concrete, is more fast and fixed when the water-proofing is used. Inasmuch as the water-proofing herein disclosed is thoroughly a part of the body material itself, the concrete does not take in and absorb the smut and dirt of the atmosphere nor can water permeate to effect corrosion or other changes in the concrete or in its coloring matter. Also the concrete product when it carries a finished face will show a higher finish or polish and one of greater permanency through the use of the compound.

It is to be understood that I do not wish to be limited to the exact proportions stated, since these may be varied within limits to produce the water-proofing compound of my invention.

I claim:

1. The process of making water proofing compound which consists in mixing sixty gallons of kerosene oil, spermaceti wax ten pounds and cotton seed oil two and one-half gallons and heating the mixture to a temperature high enough to cause the kerosene oil to dissolve the wax.

2. The herein described water proofing compound consisting of the following ingredients in about the proportions named, kerosene oil sixty gallons, spermaceti wax ten pounds and cotton seed oil two and one half gallons.

3. The herein described water proofing compound for cement, concrete or the like comprising kerosene oil, spermaceti wax and cotton seed oil, the spermaceti wax being dissolved in the kerosene oil.

4. A process for making liquid water proofing material for cement, consisting in mixing kerosene oil, spermaceti wax, cotton seed oil in about the proportions of sixty gallons, ten pounds and two and one-half gallons, respectively, heating the mixture to about one hundred eighty degrees Fahrenheit, whereby the same will be brought to a fluid condition and the wax dissolved in the kerosene oil.

5. A water proofing compound comprising the following ingredients in about the proportions named, kerosene oil sixty gallons, spermaceti wax ten pounds, cotton seed oil two and one-half gallons, said mixture being mingled with about twelve parts of water.

In witness whereof, I hereunto subscribe my name to this specification in the presence of two witnesses.

FRANK R. STEHM.

Witnesses:
I. E. TONE,
WM. RUFFEVEN.